United States Patent
Masuda et al.

(10) Patent No.: US 6,911,226 B2
(45) Date of Patent: Jun. 28, 2005

(54) COLD CONFECTIONERY AND METHOD OF PREPARING THE SAME

(75) Inventors: Yutaka Masuda, Saitama (JP); Kiyoyasu Tsukada, Ibaraki (JP); Masakatsu Usui, Tokyo (JP); Kenichi Okura, Saitama (JP)

(73) Assignee: Lotte Co., Ltd., Tokyo (JP)

( * ) Notice: Subject to any disclaimer, the term of this patent is extended or adjusted under 35 U.S.C. 154(b) by 256 days.

(21) Appl. No.: 10/126,649

(22) Filed: Apr. 22, 2002

(65) Prior Publication Data

US 2003/0104105 A1 Jun. 5, 2003

(30) Foreign Application Priority Data

Apr. 20, 2001 (JP) ........................................ 2001-123668

(51) Int. Cl.[7] .............................. A23G 3/00; A23G 9/00
(52) U.S. Cl. .................... 426/565; 426/566; 426/658
(58) Field of Search ................................. 426/565, 566, 426/658

(56) References Cited

U.S. PATENT DOCUMENTS

| | | | |
|---|---|---|---|
| 3,647,477 A * | 3/1972 | Du Ross et al. ............ 426/566 |
| 4,415,595 A | 11/1983 | Takemori et al. ........... 426/101 |
| 4,452,824 A * | 6/1984 | Cole et al. ................. 426/565 |
| 4,590,086 A | 5/1986 | Takahashi et al. .......... 426/602 |
| 4,849,242 A * | 7/1989 | Kershner .................... 426/601 |
| 5,077,076 A | 12/1991 | Gonsalves et al. .......... 426/565 |
| 5,384,146 A | 1/1995 | Gonsalves et al. .......... 426/565 |
| 5,556,659 A * | 9/1996 | De Pedro et al. ........... 426/302 |
| 5,645,881 A * | 7/1997 | Tancibok et al. ............ 426/531 |
| 5,919,510 A * | 7/1999 | Fayard et al. ............... 426/565 |
| 5,997,936 A * | 12/1999 | Jimenez-Laguna .......... 426/565 |
| 6,033,711 A | 3/2000 | Gonsalves et al. .......... 426/565 |
| 6,203,841 B1 | 3/2001 | Lynch et al. |
| 6,228,415 B1 * | 5/2001 | Jimenez-Laguna et al. . 426/565 |
| 6,395,316 B1 * | 5/2002 | Leas et al. .................. 426/101 |
| 6,534,108 B2 * | 3/2003 | Jimenez-Laguna et al. . 426/565 |

FOREIGN PATENT DOCUMENTS

| | | |
|---|---|---|
| DE | 21 47 093 | 3/1972 |
| EP | 0 191 487 | 8/1986 |
| EP | 0 884 100 | 12/1998 |
| EP | 1 051 913 | 11/2000 |
| WO | WO 95/21535 | 8/1995 |

* cited by examiner

*Primary Examiner*—N. Bhat
(74) *Attorney, Agent, or Firm*—Young & Thompson

(57) ABSTRACT

A cold confectionery and a method of preparing the same are provided. A mixture is foamed to have an overrun in the range of 150% to 500%, and frozen to a temperature of not higher than −10° C. The cold confectionery provides desirable extra-light and crisp-rich feelings in mouth with a light-snow-like softness as well as a desirable smooth spoonability. The final product also exhibits an apparent bulk-up upon sterilization with spoon.

11 Claims, No Drawings

COLD CONFECTIONERY AND METHOD OF PREPARING THE SAME

BACKGROUND OF THE INVENTION

1. Field of the Invention

The present invention relates to a cold confectionery and a method of preparing the same, and more particularly to a cold confectionery with a light texture providing a desirably crisp and a method of preparing the same.

2. Description of the Related Art

Conventional cold confectioneries such as sherbet and in-a-cup shaved ices are likely to provide heavy and sticky feelings or hard and crunch feelings. Even if it is attempted to obtain a certain light feeling by increasing the air content (over-run), then it is necessary to take additional countermeasures for improving viscosity in consideration of the content and type of stabilizer for keeping or supporting foams, resulting in an undesirable sticky feeling. It was difficult for the prior art to realize the desirably high over-run or high foam-content.

The shaved ices are usually harder and crunchier than sherbets. It was difficult to stick a spoon into the shaved ice just taken out of a freezer.

A variety of attempts have been made to overcome the above disadvantages of the shaved ices and realize a light spoonability. In this technical viewpoint, it had been known that the main factor of the hardness of the shaved ices is concerned with melting the shaved ices and subsequent re-freezing the once-melt ices. To prevent the shaved ices from melting, therefore, the shaved ice is kept at a low temperature, for example, 0° C. to 10° C., and is then filled in a cup. Subsequently, the shaved ice is then added with a low-temperature syrup. Actually, however, fragments of the shaved ice are so coarse and sized in millimeters order as difficult to realize a desirably high light-feeling.

In the above circumstances, the developments of a novel cold confectionery and a novel method of preparing the same free from the above problems are desirable.

SUMMARY OF THE INVENTION

Accordingly, it is an object of the present invention to provide a novel cold confectionery free from the above problems.

It is a further object of the present invention to provide a novel cold confectionery including an extra-light texture providing desirable crisp and light spoonability with a light-snow-like softness.

It is a furthermore object of the present invention to provide a novel cold confectionery exhibiting an apparent bulk-up upon sterilization with spoon, thereby providing a just-fallen and soft new-snow-like feeling in mouth.

It is a still further object of the present invention to provide a novel method of preparing a cold confectionery free from the above problems.

It is yet a further object of the present invention to provide a novel method of preparing a cold confectionery including an extra-light texture providing desirable crisp and light spoonability with a light-snow-like softness.

It is an additional object of the present invention to provide a novel method of preparing a cold confectionery exhibiting an apparent bulk-up upon sterilization with spoon, thereby providing a just-fallen and new-snow-like soft feeling in mouth.

The present invention provides a cold confectionery and a method of preparing the same, wherein a mixture is foamed to have an overrun in the range of 150% to 500%, and frozen to a temperature of not higher than −10° C. The cold confectionery has a light texture and provides such a novel, desirable and refreshing feeling in mouth as just-fallen-snow-like soft feeling.

The highly foamed cold confectionery with the extra-high overrun in the range of 150% to 500% may cause such a novel, desirable and refreshing feeling in mouth as just-fallen-snow-like soft feeling.

The above and other objects, features and advantages of the present invention will be apparent from the following descriptions.

DETAILED DESCRIPTION OF THE PREFERRED EMBODIMENTS

The term "iced confectionery" means cold confectionery exclusive of ice creams ice cream, ice milk and lacto-ice, which are defined by the ministerial ordinance. The iced confectionery may, for example, includes sherbet, shaved ices and block hard ices.

A first aspect of the present invention is a cold confectionery and a method of preparing the same, wherein the cold confectionery is prepared by foaming a mixture to have an overrun in the range of 150% to 500%, and more preferably 200% to 500%, and cooling the mixture to a temperature of not higher than −10° C. The cold confectionery includes an extra-light texture providing desirable crisp and light spoonability with a light-snow-like softness. The cold confectionery also exhibits an apparent bulk-up upon sterilization with spoon, thereby providing a just-fallen and soft new-snow-like feeling in mouth.

It is preferable for obtaining the above extra-high overrun that the mixture includes, as foaming agents, saccharose fatty acid ester in the range of 0.005 percents by weight to 0.2 percents by weight, more preferably 0.01 percents by weight to 0.1 percents by weight in combination with polyglycerin fatty acid ester in the range of 0.005 percents by weight to 0.2 percents by weight, more preferably 0.01 percents by weight to 0.1 percents by weight.

If the content of the foaming agent is less than 0.05 percents by weight, then it is difficult to obtain a sufficient foaming function of the foaming agent. If the content of the foaming agent is more than 0.2 percents by weight, then the bitter taste of the foaming agent and the undesirable odor of the fatty acid are remarkable, resulting in a deteriorated taste of the cold confectionery.

It is further preferable that the saccharose fatty acid ester has not less than 70 percents by weight of mono-ester content, and not less than 90 percents by weight of bonded fatty acids thereof comprise at least one fatty acid selected from the group consisting of caprylate, caprate, laurate, and myristate, and further that the polyglycerin fatty acid ester has not less than 70 percents by weight of mono-ester content, and not less than 90 percents by weight of bonded fatty acids thereof comprise at least one fatty acid selected from the group consisting of laurate and myristate, and polyglycerin of the polyglycerin fatty acid ester comprises one of hexaglycerin and decaglycerin.

It is further more preferable that a substance obtained by hydrolyzing a protein such as wheat, soybeans and albumen is used as an additional foaming agent in combination with the foaming agent.

It is moreover preferable that at least one of quillaia saponin and sodium alginate is used as a foamable agent in combination with the foaming agent.

It is important to prevent separation of the liquid-state mixture and destruction of the foams during the process of filling the foamed mixture into a container and/or the other processes of preserving and freezing the same, for which reason stabilization of the generated foams is the significant importance. In this viewpoint, it is preferable to employ such available stabilizers as commonly used for the cold confectioneries.

It is possible to use a thickener polysaccharides and protein, for example, as a stabilizer commonly used for the cold confectioneries, provided that in order to obtain the cold confectionery providing a smooth feeling, the usage amount and the type of the stabilizer and combination in use may be decided to avoid such an excessive increase in viscosity thereof as making it difficult to generate foams and also avoid a paste-like undesirable taste. Therefore, it is effective to employ a stabilizer with such foamability-enhancing and supporting effects as of low molecular gelatins.

Also, it may optionally be free to blend the cold confectionery with one or more taste-improving and/or flavor-improving additional substances, for example, juices and pulps of fruits such as orange and grapefruit and flavoring sources such as coffee, black tea and powdered green tea.

Further, it may optionally be free to add the cold confectionery with one or more sweeteners, for example, any available sugars such as sugar, fructose, fructose-grape sugar liquid-state sugar, and starch syrup, and any available sugar alcohols, such as xylitol, erythlitol, and lactitol, as well as any available high sweeteners such as aspartame, suclarose, acesulfame potassium, and Stevia.

It is also preferable that the content of a solid-state component in the mixture is not more than 20 percents by weight of the cold confectionery. If the solid-state component is more than 20 percents by weight of the cold confectionery, then this makes it difficult to foam the mixture. Further, the increase in the content of the solid-state component in the mixture causes the decrease in freezing point of the mixture, whereby the cold confectionery as the final product may provide an unintended damp-rich and crisp-poor feeling in mouth.

It is also no problem to use one or more flavor-improving substances and flavor-masking substances alone or in combination for masking the undesirable flavor of the foaming agent. For instance, enzymolyzing lecithin, sodium gluconate, potassium gluconate, sodium glutamate and vitamin P may preferably be available.

Foaming the mixture may be made by using any available equipments, for example, a batch type foaming machine, a continuous foaming machine, a batch type ice cram freezer and a continuous ice cream freezer. Any available foaming methods may be applicable unless separation of the serum is caused after the mixture was foamed. A continuous static mixture may, for example, be usable.

If the foaming process is finished at a higher temperature than the freezing point, then immediate freezing to the foamed mixture is preferable for avoiding possible destruction of the foams and possible separation of water from foam-membrane. In other words, it is desirable to shorten a time until the mixture shows a temperature drop below the freezing point since the foaming process has been completed.

In accordance with the present invention, the mixture may optionally be foamed and cooled together at a cooling temperature of not higher than about 5° C., preferably in the range of about −1.8° C. to about −4.5° C., thereby obtaining an intermediate product. The intermediate product provides no desirable extra-light and crisp-rich feelings in mouth nor light-snow-like softness without any desirable smooth spoonability. The intermediate product also exhibits no apparent bulk-up upon sterilization with spoon, nor desirable just-fallen-new-snow-like soft feeling in mouth.

In order to obtain those desirable properties and characteristics, it is necessary to cool the intermediate product to a lower temperature of not higher than −10° C., thereby obtaining the cold confectionery as the final product which does provide the desirable extra-light and crisp-rich feelings in mouth with a light-snow-like softness as well as the desirable smooth spoonability. The final product also does exhibit the apparent bulk-up upon sterilization with spoon, and does provide the desirable just-fallen-new-snow-like feeling in mouth.

EXAMPLE 1

140 g of sugar, 3.0 g of stabilizer (thickener and stabilizer for cold confectioneries), 0.5 g of decaglycerin laurate with at least 70 percents by weight of monoester content and at least 95 percents by weight of laurate content in bonded fatty acid, 0.5 g of saccharose laurate with at least 80 percents by, weight of monoester content and at least 95 percents by weight of laurate content in bonded fatty acid, 0.5 g of aspartame (Palsweet G-100: trademark of Ajinomoto Co., Inc.), 850.5 g of water were heated and mixed by using a high-speed mixer and then maintained at 80° for ten minutes, and subsequently cooled to 5° C., thereby obtaining a cold confectionery mixture. The cold confectionery mixture was then frozen by using a batch type ice cream freezer to obtain a foamed mixture as the intermediate product which has an over-run of 200%.

The foamed mixture as the intermediate product was then filled into a paper container of 300 ml-capacity and placed in a freezer maintained at −35° C. for three hours, thereby to obtain a cold confectionery as the final product.

The cold confectionery as the final product was stored at −20° for one hour prior to tasting the same. It was confirmed that the cold confectionery allows a smooth spoon-sticking therein. It was also confirmed that the cold confectionery provides a novel dry-snow-like feeling in mouth. It was further confirmed that a light sterilization to the cold confectionery by spoon causes such an apparent bulk-up as providing a just-fallen new-snow-like texture in mouth.

EXAMPLE 2

The cold confectionery was prepared under substantially the same conditions as of Example 1, except for using various kinds of the foaming agents. 140 g of sugar, 3.0 g of stabilizer (thickener and stabilizer for cold confectioneries), 0.3 g of polyglycerin fatty acid ester, 0.3 g of saccharose fatty acid ester, 0.5 g of aspartame (Palsweet G-100: trademark of Ajinomoto Co., Inc.), 850.9 g of water were heated and mixed by using the high-speed mixer and then maintained at 80° C. for ten minutes, and subsequently cooled to 5° C., thereby obtaining a cold confectionery mixture. The cold confectionery mixture was then frozen by using a batch type ice cream freezer to obtain a foamed mixture as the intermediate product.

The foamed mixture as the intermediate product was then filled into a paper container of 300 ml-capacity and placed in a freezer maintained at −35° C. for three hours, thereby to obtain a cold confectionery as the final product.

The kinds of the used polyglycerin fatty acid ester and the kinds of the used saccharose fatty acid ester are as follows.

|  | chain length |
|---|---|
| Saccharose Fatty Acid Ester: | |
| Caprylate | 8 |
| Caprate | 10 |
| Laurate | 12 |
| Myristate | 14 |
| Palmitate | 16 |
| Polyglycerin Fatty Acid Ester: | |
| (Decaglycerin Ester) | |
| Laurate | 12 |
| Myristate | 14 |
| Palmitate | 16 |
| (Hexaglycerin Ester) | |
| Laurate | 12 |
| Myristate | 14 |
| Palmitate | 16 |
| (Tetraglycerin Ester) | |
| Laurate | 12 |
| Myristate | 14 |
| Palmitate | 16 |

It was confirmed that the over-run of the foamed mixture as the intermediate product varies over the kinds of the above foaming agent. Namely, the over-run of the cold confectionery depends on the kinds of the used foaming agents.

Ir The tasting test of the cold confectionery as the final product was made in the same manner as in Example 1. The following five tables 1-1, 1-2, 1-3, 1-4 and 1-5 show various kinds of the used foaming agents and evaluations on the taste to the cold confectionery. "A" means that the feeling is good due to light texture and crisp. "B" means that the feeling is not good due to heavy texture and crisp. "C" means that the feeling is bad due to heavy texture and non-crisp.

TABLE 1-1

| Foaming Agents | Chain Length | weight % | | | | | | | | |
|---|---|---|---|---|---|---|---|---|---|---|
| Saccharose Fatty Acid Ester | | | | | | | | | | |
| Caprylate | 8 | 0.03 | 0.03 | 0.03 | 0.03 | 0.03 | 0.03 | 0.03 | 0.03 | 0.03 |
| Caprate | 10 | | | | | | | | | |
| Laurate | 12 | | | | | | | | | |
| Myristate | 14 | | | | | | | | | |
| Palmitate | 16 | | | | | | | | | |
| Decaglycerin Fatty Acid Ester | | | | | | | | | | |
| Laurate | 12 | 0.03 | | | | | | | | |
| Myristate | 14 | | 0.03 | | | | | | | |
| Palmitate | 16 | | | 0.03 | | | | | | |
| Hexaglycerin Fatty Acid Ester | | | | | | | | | | |
| Laurate | 12 | | | | 0.03 | | | | | |
| Myristate | 14 | | | | | 0.03 | | | | |
| Palmitate | 16 | | | | | | 0.03 | | | |
| Tetraglycerin Fatty Acid Ester | | | | | | | | | | |
| Laurate | 12 | | | | | | | 0.03 | | |
| Myristate | 14 | | | | | | | | 0.03 | |
| Palmitate | 16 | | | | | | | | | 0.03 |
| Overrun | | 280 | 180 | 140 | 220 | 180 | 140 | 100 | 100 | 100 |
| Judgement | | A | A | C | A | A | C | C | C | C |

TABLE 1-2

| Foaming Agents | Chain Length | weight % | | | | | | | | |
|---|---|---|---|---|---|---|---|---|---|---|
| Saccharose Fatty Acid Ester | | | | | | | | | | |
| Caprylate | 8 | | | | | | | | | |
| Caprate | 10 | 0.03 | 0.03 | 0.03 | 0.03 | 0.03 | 0.03 | 0.03 | 0.03 | 0.03 |
| Laurate | 12 | | | | | | | | | |
| Myristate | 14 | | | | | | | | | |
| Palmitate | 16 | | | | | | | | | |
| Decaglycerin Fatty Acid | | | | | | | | | | |

TABLE 1-2-continued

| Foaming Agents | Chain Length | weight % | | | | | | | | |
|---|---|---|---|---|---|---|---|---|---|---|
| Ester | | | | | | | | | | |
| Laurate | 12 | 0.03 | | | | | | | | |
| Myristate | 14 | | 0.03 | | | | | | | |
| Palmitate | 16 | | | 0.03 | | | | | | |
| Hexaglycerin Fatty Acid Ester | | | | | | | | | | |
| Laurate | 12 | | | | 0.03 | | | | | |
| Myristate | 14 | | | | | 0.03 | | | | |
| Palmitate | 16 | | | | | | 0.03 | | | |
| Tetraglycerin Fatty Acid Ester | | | | | | | | | | |
| Laurate | 12 | | | | | | | 0.03 | | |
| Myristate | 14 | | | | | | | | 0.03 | |
| Palmitate | 16 | | | | | | | | | 0.03 |
| Overrun | | 300 | 200 | 130 | 220 | 180 | 140 | 100 | 100 | 100 |
| Judgement | | A | A | C | A | A | C | C | C | C |

TABLE 1-3

| Foaming Agents | Chain Length | weight % | | | | | | | | |
|---|---|---|---|---|---|---|---|---|---|---|
| Saccharose Fatty Acid Ester | | | | | | | | | | |
| Caprylate | 8 | | | | | | | | | |
| Caprate | 10 | | | | | | | | | |
| Laurate | 12 | 0.03 | 0.03 | 0.03 | 0.03 | 0.03 | 0.03 | 0.03 | 0.03 | 0.03 |
| Myristate | 14 | | | | | | | | | |
| Palmitate | 16 | | | | | | | | | |
| Decaglycerin Fatty Acid Ester | | | | | | | | | | |
| Laurate | 12 | 0.03 | | | | | | | | |
| Myristate | 14 | | 0.03 | | | | | | | |
| Palmitate | 16 | | | 0.03 | | | | | | |
| Hexaglycerin Fatty Acid Ester | | | | | | | | | | |
| Laurate | 12 | | | | 0.03 | | | | | |
| Myristate | 14 | | | | | 0.03 | | | | |
| Palmitate | 16 | | | | | | 0.03 | | | |
| Tetraglycerin Fatty Acid Ester | | | | | | | | | | |
| Laurate | 12 | | | | | | | 0.03 | | |
| Myristate | 14 | | | | | | | | 0.03 | |
| Palmitate | 16 | | | | | | | | | 0.03 |
| Overrun | | 320 | 220 | 140 | 230 | 200 | 140 | 100 | 100 | 100 |
| Judgement | | A | A | C | A | A | C | C | C | C |

TABLE 1-4

| Foaming Agents | Chain Length | weight % | | | | | | | | |
|---|---|---|---|---|---|---|---|---|---|---|
| Saccharose Fatty Acid Ester | | | | | | | | | | |
| Caprylate | 8 | | | | | | | | | |
| Caprate | 10 | | | | | | | | | |
| Laurate | 12 | | | | | | | | | |
| Myristate | 14 | 0.03 | 0.03 | 0.03 | 0.03 | 0.03 | 0.03 | 0.03 | 0.03 | 0.03 |
| Palmitate | 16 | | | | | | | | | |
| Decaglycerin Fatty Acid Ester | | | | | | | | | | |
| Laurate | 12 | 0.03 | | | | | | | | |

TABLE 1-4-continued

| Foaming Agents | Chain Length | weight % | | | | | | | | |
|---|---|---|---|---|---|---|---|---|---|---|
| Myristate | 14 | 0.03 | | | | | | | | |
| Palmitate | 16 | | 0.03 | | | | | | | |
| Hexaglycerin Fatty Acid Ester | | | | | | | | | | |
| Laurate | 12 | | | 0.03 | | | | | | |
| Myristate | 14 | | | | 0.03 | | | | | |
| Palmitate | 16 | | | | | 0.03 | | | | |
| Tetraglycerin Fatty Acid Ester | | | | | | | | | | |
| Laurate | 12 | | | | | | 0.03 | | | |
| Myristate | 14 | | | | | | | 0.03 | | |
| Palmitate | 16 | | | | | | | | 0.03 | |
| Overrun | | 200 | 150 | 120 | 180 | 150 | 110 | 80 | 80 | 80 |
| Judgement | | A | B | C | A | B | C | C | C | C |

TABLE 1-5

| Foaming Agents | Chain Length | weight % | | | | | | | | |
|---|---|---|---|---|---|---|---|---|---|---|
| Saccharose Fatty Acid Ester | | | | | | | | | | |
| Caprylate | 8 | | | | | | | | | |
| Caprate | 10 | | | | | | | | | |
| Laurate | 12 | | | | | | | | | |
| Myristate | 14 | | | | | | | | | |
| Palmitate | 16 | 0.03 | 0.03 | 0.03 | 0.03 | 0.03 | 0.03 | 0.03 | 0.03 | 0.03 |
| Decaglycerin Fatty Acid Ester | | | | | | | | | | |
| Laurate | 12 | 0.03 | | | | | | | | |
| Myristate | 14 | | 0.03 | | | | | | | |
| Palmitate | 16 | | | 0.03 | | | | | | |
| Hexaglycerin Fatty Acid Ester | | | | | | | | | | |
| Laurate | 12 | | | | 0.03 | | | | | |
| Myristate | 14 | | | | | 0.03 | | | | |
| Palmitate | 16 | | | | | | 0.03 | | | |
| Tetraglycerin Fatty Acid Ester | | | | | | | | | | |
| Laurate | 12 | | | | | | | 0.03 | | |
| Myristate | 14 | | | | | | | | 0.03 | |
| Palmitate | 16 | | | | | | | | | 0.03 |
| Overrun | | 140 | 120 | 100 | 140 | 110 | 90 | 80 | 80 | 80 |
| Judgement | | C | C | C | C | C | C | C | C | C |

EXAMPLE 3

The cold confectionery was prepared under substantially the same conditions as of Example 1, except for using various contents of decaglycerin laurate and saccharose laurate as the foaming agents.

140 g of sugar, 3.0 g of stabilizer (thickener and stabilizer for cold confectioneries), the following content of decaglycerin laurate, the following content of saccharose laurate, 0.5 g of aspartame (Palsweet G-100: trademark of Ajinomoto Co., Inc.), the following amount of water were heated and mixed by using the high-speed mixer and then maintained at 80° C. for ten minutes, and subsequently cooled to 5° C., thereby obtaining a cold confectionery mixture. The amount of water was decided so that a total amount is just 1000.0 g. The cold confectionery mixture was then frozen by using a batch type ice cream freezer to obtain a foamed mixture as the intermediate product.

The foamed mixture as the intermediate product was then filled into a paper container of 300 ml-capacity and placed in a freezer maintained at −35° C. for three hours, thereby to obtain a cold confectionery as the final product.

It was confirmed that the over-run of the foamed mixture as the intermediate product varies over the contents of the used foaming agent. Namely, the over-run of the cold confectionery depends on the contents of the used foaming agents.

The tasting test of the cold confectionery as the final product was made in the same manner as in Example 1. The following six tables 2-1, 2-2, 2-3, 2-4, 2-5 and 2-6 show various contents of the used foaming agents and evaluations on the taste to the cold confectionery.

For the evaluation on the feeling in mouth, "○" means that the feeling is good due to light texture and crisp. "Δ" means that the feeling is not good due to heavy texture and crisp. "X" means that the feeling is bad due to heavy texture and non-crisp.

For the evaluation on the taste and flavor, "○" means that the a taste and flavor are very good. "Δ" means that the taste and flavor are good even with a slight taste of the foaming agents. "X" means that the taste and flavor are bad due to a strong taste of the foaming agents.

For the comprehensive evaluation, "○" means that the feeling and taste are good. "Δ" means that the feeling and taste are not good. "X" means that the feeling and taste are bad.

TABLE 2-1

|  | 1 | 2 | 3 | 4 | 5 | 6 |
|---|---|---|---|---|---|---|
| Sugar | 140.0 g | 140.0 g | 140.0 g | 140.0 g | 140.0 g | 140.0 g |
| Aspartame | 0.5 g | 0.5 g | 0.5 g | 0.5 g | 0.5 g | 0.5 g |
| Stabilizing agent | 3.0 g | 3.0 g | 3.0 g | 3.0 g | 3.0 g | 3.0 g |
| Saccharose laurate | 0.04 g | 0.04 g | 0.04 g | 0.04 g | 0.04 g | 0.04 g |
| Decaglycerin laurate | 0.04 g | 0.05 g | 0.10 g | 1.00 g | 2.00 g | 2.50 g |
| Water | 856.42 g | 856.41 g | 856.36 g | 855.46 g | 854.46 g | 853.96 g |
| Total | 1000.0 g | 1000.0 g | 1000.0 g | 1000.0 g | 1000.0 g | 1000.0 g |
| Overrun | 100 | 130 | 130 | 140 | 145 | 145 |
| Flavor | ○ | ○ | ○ | ○ | Δ | X |
| Feeling | X | X | X | X | X | X |
| comprehensive evaluation | X | X | X | X | X | X |

TABLE 2-2

|  | 7 | 8 | 9 | 10 | 11 | 12 |
|---|---|---|---|---|---|---|
| Sugar | 140.0 g | 140.0 g | 140.0 g | 140.0 g | 140.0 g | 140.0 g |
| Aspartame | 0.5 g | 0.5 g | 0.5 g | 0.5 g | 0.5 g | 0.5 g |
| Stabilizing agent | 3.0 g | 3.0 g | 3.0 g | 3.0 g | 3.0 g | 3.0 g |
| Saccharose laurate | 0.05 g | 0.05 g | 0.05 g | 0.05 g | 0.05 g | 0.05 g |
| Decaglycerin laurate | 0.04 g | 0.05 g | 0.10 g | 1.00 g | 2.00 g | 2.50 g |
| Water | 856.41 g | 856.40 g | 856.35 g | 855.45 g | 854.45 g | 853.95 g |
| Total | 1000.0 g | 1000.0 g | 1000.0 g | 1000.0 g | 1000.0 g | 1000.0 g |
| Overrun | 140 | 150 | 190 | 220 | 230 | 230 |
| Flavor | ○ | ○ | ○ | ○ | Δ | X |
| Feeling | X | Δ | ○ | ○ | ○ | Δ |
| comprehensive evaluation | X | Δ | ○ | ○ | ○ | X |

TABLE 2-3

|  | 13 | 14 | 15 | 16 | 17 | 18 |
|---|---|---|---|---|---|---|
| Sugar | 140.0 g | 140.0 g | 140.0 g | 140.0 g | 140.0 g | 140.0 g |
| Aspartame | 0.5 g | 0.5 g | 0.5 g | 0.5 g | 0.5 g | 0.5 g |
| Stabilizing agent | 3.0 g | 3.0 g | 3.0 g | 3.0 g | 3.0 g | 3.0 g |
| Saccharose laurate | 0.10 g | 0.10 g | 0.10 g | 0.10 g | 0.10 g | 0.10 g |
| Decaglycerin laurate | 0.04 g | 0.05 g | 0.10 g | 1.00 g | 2.00 g | 2.50 g |
| Water | 856.36 g | 856.35 g | 856.30 g | 855.40 g | 854.40 g | 853.90 g |
| Total | 1000.0 g | 1000.0 g | 1000.0 g | 1000.0 g | 1000.0 g | 1000.0 g |
| Overrun | 140 | 150 | 180 | 200 | 220 | 250 |
| Flavor | ○ | ○ | ○ | ○ | Δ | X |
| Feeling | X | Δ | ○ | ○ | ○ | Δ |
| Comprehensive evaluation | X | Δ | ○ | ○ | ○ | X |

TABLE 2-4

|  | 19 | 20 | 21 | 22 | 23 | 24 |
|---|---|---|---|---|---|---|
| Sugar | 140.0 g | 140.0 g | 140.0 g | 140.0 g | 140.0 g | 140.0 g |
| Aspartame | 0.5 g | 0.5 g | 0.5 g | 0.5 g | 0.5 g | 0.5 g |
| Stabilizing agent | 3.0 g | 3.0 g | 3.0 g | 3.0 g | 3.0 g | 3.0 g |
| Saccharose laurate | 1.00 g | 1.00 g | 1.00 g | 1.00 g | 1.00 g | 1.00 g |
| Decaglycerin laurate | 0.04 g | 0.05 g | 0.10 g | 1.00 g | 2.00 g | 2.50 g |
| Water | 855.46 g | 855.45 g | 855.40 g | 854.50 g | 853.50 g | 853.00 g |
| Total | 1000.0 g | 1000.0 g | 1000.0 g | 1000.0 g | 1000.0 g | 1000.0 g |
| Overrun | 240 | 250 | 260 | 300 | 400 | 420 |

TABLE 2-4-continued

|  | 19 | 20 | 21 | 22 | 23 | 24 |
|---|---|---|---|---|---|---|
| Flavor | ○ | ○ | ○ | ○ | Δ | X |
| Feeling | X | ○ | ○ | ○ | ○ | Δ |
| Comprehensive evaluation | X | ○ | ○ | ○ | ○ | X |

TABLE 2-5

|  | 25 | 26 | 27 | 28 | 29 | 30 |
|---|---|---|---|---|---|---|
| Sugar | 140.0 g | 140.0 g | 140.0 g | 140.0 g | 140.0 g | 140.0 g |
| Aspartame | 0.5 g | 0.5 g | 0.5 g | 0.5 g | 0.5 g | 0.5 g |
| Stabilizing agent | 3.0 g | 3.0 g | 3.0 g | 3.0 g | 3.0 g | 3.0 g |
| Saccharose laurate | 2.00 g | 2.00 g | 2.00 g | 2.00 g | 2.00 g | 2.00 g |
| Decaglycerin laurate | 0.04 g | 0.05 g | 0.10 g | 1.00 g | 2.00 g | 2.50 g |
| Water | 854.46 g | 854.45 g | 854.40 g | 853.50 g | 852.50 g | 852.00 g |
| Total | 1000.0 g | 1000.0 g | 1000.0 g | 1000.0 g | 1000.0 g | 1000.0 g |
| Overrun | 270 | 280 | 290 | 320 | 420 | 420 |
| Flavor | Δ | Δ | Δ | Δ | Δ | X |
| Feeling | X | Δ | ○ | ○ | Δ | Δ |
| Comprehensive evaluation | X | Δ | ○ | ○ | Δ | X |

TABLE 2-6

|  | 31 | 32 | 33 | 34 | 35 | 36 |
|---|---|---|---|---|---|---|
| Sugar | 140.0 g | 140.0 g | 140.0 g | 140.0 g | 140.0 g | 140.0 g |
| Aspartame | 0.5 g | 0.5 g | 0.5 g | 0.5 g | 0.5 g | 0.5 g |
| Stabilizing agent | 3.0 g | 3.0 g | 3.0 g | 3.0 g | 3.0 g | 3.0 g |
| Saccharose laurate | 2.50 g | 2.50 g | 2.50 g | 2.50 g | 2.50 g | 2.50 g |
| Decaglycerin laurate | 0.04 g | 0.05 g | 0.10 g | 1.00 g | 2.00 g | 2.50 g |
| Water | 853.96 g | 853.95 g | 853.90 g | 853.00 g | 852.00 g | 851.50 g |
| Total | 1000.0 g | 1000.0 g | 1000.0 g | 1000.0 g | 1000.0 g | 1000.0 g |
| Overrun | 280 | 290 | 300 | 330 | 430 | 430 |
| Flavor | X | X | X | X | X | X |
| Feeling | Δ | Δ | Δ | Δ | Δ | X |
| Comprehensive evaluation | X | X | X | X | X | X |

If the content of saccharose laurate is not more than 0.04 percents by weight, then it is difficult to obtain a sufficiently high over-run independent from the contents of decaglycerin laurate. In this case, the above described effects of the present invention can not be obtained.

If the content of decaglycerin laurate is not more than 0.004 percents by weight and the content of saccharose laurate is at least 0.1 percent by weight, then an over-run of at least 15% can be obtained, whilst the above described effects of the present invention can not be obtained because of a poor-crisp and sticky feeling.

If the respective contents and decaglycerin laurate and saccharose laurate exceed 0.2 percents by weight, then the texture and the feeling in mouth are no problems, but the taste and flavor are bad due to a strong taste of the foaming agents.

EXAMPLE 4

The cold confectionery was prepared under substantially the same conditions as of Example 1, except for various foaming amounts of the mixture as the intermediate products to obtain various over-run values of the cold confectionery as the final products.

140 g of sugar, 3.0 g of stabilizer (thickener and stabilizer for cold confectioneries), 0.5 g of decaglycerin laurate with at least 70 percents by weight of monoester content and at least 95 percents by weight of laurate content in bonded fatty acid, 0.5 g of saccharose laurate with at least 80 percents by weight of monoester content and at least 95 percents by weight of laurate content in bonded fatty acid, 0.5 g of aspartame (Palsweet G-100: trademark of Ajinomoto Co., Inc.), 850.5 g of water were heated and mixed by using a high-speed mixer and then maintained at 80' for ten minutes, and subsequently cooled to 5° C., thereby obtaining a cold confectionery mixture.

The cold confectionery mixture was then frozen by using a batch type ice cream freezer to obtain foamed mixtures with various over-run values of 100%, 150%, 200%, 250%, 300%, and 400% as the intermediate products. The foamed mixtures as the intermediate product were then filled into paper containers of 300 ml-capacity and placed in a freezer maintained at −35° C. for three hours, thereby to obtain cold confectioneries with various over-run values of 100%, 150%, 200%, 250%, 300%, and 400% as the final product.

Separately, 200 g of the cold confectionery mixture was put in a bowl of the mixer and then whipped or foamed by a wire-type whipper to obtain foamed mixtures with various over-run values of 500%, and 600% as the intermediate products. The foamed mixtures as the intermediate product were then filled into paper containers of 300 ml-capacity and placed in a freezer maintained at −35° C. for three hours, thereby to obtain cold confectioneries with various over-run values of 500%, and 600% as the final product.

The tasting test of the cold confectioneries as the final product was made in the same manner as in Example 1. The following two tables 3-1 and 3-2 show various over-run values of the cold confectioneries and evaluations on the feelings to the cold confectionery.

For the evaluation on the feeling in mouth, "○" means that the feeling is good due to light texture and crisp. "Δ" means that the feeling is not good due to heavy texture and crisp. "▲" means that the feeling is bad due to heavy texture and non-crisp.

TABLE 3-1

|  | 1 | 2 | 3 | 4 |
|---|---|---|---|---|
| Overrun | 100 | 150 | 200 | 250 |
| Feeling | Hard | Somewhat hard but crispy | Light, crispy and good | Light, crispy and good |
| Evaluation | X | Δ | ○ | ○ |

TABLE 3-2

|  | 5 | 6 | 7 | 8 |
|---|---|---|---|---|
| Overrun | 300 | 400 | 500 | 600 |
| Feeling | Light, crispy and good | Slightly reduced crispy | reduced crispy | Too light with no crispy |
| Evaluation | ○ | ○ | Δ | X |

EXAMPLE 5

The cold confectionery was prepared under substantially the same conditions as of Example 1, except that foaming agents with reduced monoester contents are used for foaming the mixture as the intermediate products.

140 g of sugar, 3.0 g of stabilizer (thickener and stabilizer for cold confectioneries), 0.5 g of saccharose laurate with 50 percents by weight of monoester content, 30 percents by weight of diester content, and 20 percents by weight of triester content, 0.5 g of decaglycerin laurate with 50 percents by weight of monoester content, 20 percents by weight of diester content, 15 percents by weight of triester content, and 15 percents by weight of other esters content, 0.5 g of aspartame (Palsweet G-100: trademark of Ajinomoto Co., Inc.), 850.5 g of water were heated and mixed by using a high-speed mixer and then maintained at 80° C. for ten minutes, and subsequently cooled to 5° C., thereby obtaining a cold confectionery mixture.

The cold confectionery mixture was then frozen by using a batch type ice cream freezer to obtain a foamed mixture with an over-run of 80% as the intermediate product. The foamed mixture as the intermediate product was then filled into a paper container of 300 ml-capacity and placed in a freezer maintained at −35° C. for three hours, thereby to obtain a cold confectionery as the final product.

The cold confectionery as the final product was stored at −20° C. for one hour prior to tasting the same. It was confirmed that the cold confectionery makes difficult a smooth spoon-sticking therein. It was also confirmed that the cold confectionery provides a novel hard-snow-like hard feeling in mouth.

EXAMPLE 6

The cold confectionery was prepared under substantially the same conditions as of Example 1, except for additional bending a fruit juice to the cold confectionery.

140 g of sugar, 3.0 g of stabilizer (thickener and stabilizer for cold confectioneries), 0.5 g of decaglycerin laurate with at least 70 percents by weight of monoester content and at least 95 percents by weight of laurate content in bonded fatty acid, 0.5 g of saccharose laurate with at least 80 percents by weight of monoester content and at least 95 percents by weight of laurate content in bonded fatty acid, 0.1 g of suclarose, 0.4 g of aspartame (Palsweet G-100: trademark of Ajinomoto Co., Inc.), 873.4 g of water were heated and mixed by using a high-speed mixer and then maintained at 80° C. for ten minutes, and subsequently cooled to 5° C. 20.0 g of an orange juice, 1.5 g of a citric acid, 1.0 g of an orange flavor were added and sterilized, thereby obtaining a cold confectionery mixture. 800 g of the cold confectionery mixture was then frozen by using a batch type ice cream freezer to obtain a foamed mixture as the intermediate product which has an over-run of 250%.

The foamed mixture as the intermediate product was then filled into a plastic container of 200 ml-capacity and placed in a freezer maintained at −35° C. for three hours, thereby to obtain a cold confectionery as the final product.

The cold confectionery as the final product was stored at −20° C. for one hour prior to tasting the same. It was confirmed that the cold confectionery allows a smooth spoon-sticking therein. It was also confirmed that the cold confectionery provides a novel dry-snow-like feeling in mouth. It was further confirmed that the additionally blended orange flavor improves the flavor and taste of the cold confectionery.

EXAMPLE 7

The cold confectionery was prepared under substantially the same conditions as of Example 1, except for foaming the mixture at a temperature over the freezing point.

60 g of sugar, 60 g of fructose, 3.0 g of stabilizer (thickener and stabilizer for cold confectioneries), 0.5 g of decaglycerin laurate with at least 70 percents by weight of monoester content and at least 95 percents by weight of laurate content in bonded fatty acid, 0.5 g of saccharose laurate with at least 80 percents by weight of monoester content and at least 95 percents by weight of laurate content in bonded fatty acid, 0.1 g of suclarose, 0.4 g of aspartame (Palsweet G-100: trademark of Ajinomoto Co., Inc.), 875.9 g of water were heated and mixed by using a high-speed mixer and then maintained at 80° C. for ten minutes, and subsequently cooled to 5°, thereby obtaining a cold confectionery mixture.

The cold confectionery mixture was put in a bowl of the mixer and then whipped by a wired whipper, whereby the mixture was foamed to obtain a foamed mixture which has an over-run of 500%. 500 g of the foamed mixture was then frozen and mixed by using a batch type ice cream freezer to obtain a foamed mixture as the intermediate product which has an over-run of 450%.

The foamed mixture as the intermediate product was then filled into a plastic container of 200 ml-capacity and placed in a freezer maintained at −35° C. for three hours, thereby to obtain a cold confectionery as the final product.

The cold confectionery as the final product was stored at −20° C. for one hour prior to tasting the same. It was confirmed that the cold confectionery allows a smooth spoon-sticking therein. It was also confirmed that the cold confectionery provides a novel dry-snow-like feeling in mouth.

EXAMPLE 8

The cold confectionery was prepared under substantially the same conditions as of Example 1, except for additionally using a gelatin.

60 g of sugar, 60 g of fructose, 1.0 g of stabilizer (thickener and stabilizer for cold confectioneries), 2.0 g of gelatin, 0.5 g of decaglycerin laurate with at least 70 percents by weight of monoester content and at least 95 percents by weight of laurate content in bonded fatty acid, 0.5 g of saccharose laurate with at least 80 percents by weight of monoester content and at least 95 percents by weight of laurate content in bonded fatty acid, 0.1 g of suclarose, 0.4 g of aspartame (Palsweet G-100: trademark of Ajinomoto Co., Inc.), 875.9 g of water were heated and mixed by using a high-speed mixer and then maintained at 80° C. for ten minutes, and subsequently cooled to 5° C., thereby obtaining a cold confectionery mixture. 600 g of the mixture was then frozen and mixed by using a batch type ice cream freezer to obtain a foamed mixture as the intermediate product which has an over-run of 250%.

The foamed mixture as the intermediate product was then filled into a paper container of 300 ml-capacity and placed in a freezer maintained at −35° C. for three hours, thereby to obtain a cold confectionery as the final product.

The cold confectionery as the final product was stored at −20° C. for one hour prior to tasting the same. It was confirmed that the cold confectionery allows a smooth spoon-sticking therein. It was also confirmed that the cold confectionery provides a novel dry-snow-like feeling in mouth.

EXAMPLE 9

The cold confectionery was prepared under substantially the same conditions as of Example 1, except that the mixture was frozen and mixed by use of a continuous ice cream freezer.

6000 g of sugar, 6000 g of fructose, 100.0 g of stabilizer (thickener and stabilizer for cold confectioneries), 200.0 g of gelatin, 50.0 g of decaglycerin laurate with at least 70 percents by weight of monoester content and at least 95 percents by weight of laurate content in bonded fatty acid, 50.0 g of saccharose laurate with at least 80 percents by weight of monoester content and at least 95 percents by weight of laurate content in bonded fatty acid, 10.0 g of suclarose, 40.0 g of aspartame (Palsweet G-100: trademark of Ajinomoto Co., Inc.), 87590 g of water were put into a tank of 200 litters capacity and heated and sterilized by paddling blades. After the temperature reaches 65° C., the mixture was homogenized by a homogenizer under a homogenization pressure of 10 kg/cm$^2$, and subsequently cooled to 5° C., thereby obtaining a cold confectionery mixture. The mixture was then frozen to −3.0° C. and mixed by using a small-size continuous freezer to obtain a foamed mixture as the intermediate product which has an over-run of 280%.

The foamed mixture as the intermediate product was then filled into a plastic container of 2000 ml-capacity and placed in a freezer maintained at −35° C. for three hours, thereby to obtain a cold confectionery as the final product.

The cold confectionery as the final product was stored at −20° C. for one hour prior to tasting the same. It was confirmed that the cold confectionery allows a smooth spoon-sticking therein or a good spoonability. It was also confirmed that the cold confectionery provides a novel dry-snow-like feeling in mouth.

Although the invention has been described above in connection with several preferred embodiments therefor, it will be appreciated that those embodiments have been provided solely for illustrating the invention, and not in a limiting sense. Numerous modifications and substitutions of equivalent materials and techniques will be readily apparent to those skilled in the art after reading the present application, and all such modifications and substitutions are expressly understood to fall within the true scope and spirit of the appended claims.

What is claimed is:

1. A method of preparing a cold confectionery, said method comprising:
    foaming a mixture to have an overrun in the range of 150% to 500%; and
    cooling said mixture to a temperature of not higher than −10° C., wherein said mixture is foamed by using, as foaming agents, saccharose fatty acid ester in the range of 0.005 percents by weight to 0.2 percents by weight in combination with polyglycerin fatty acid ester in the range of 0.005 percents by weight to 0.2 percents by weight.

2. The method of claim 1,
    wherein foaming said mixture is completed in a temperature range over a freezing point, and subsequently said mixture is frozen.

3. The method as claimed in claim 1, wherein said saccharose fatty acid ester has not less than 70 percents by weight of mono-ester content, and not less than 90 percents by weight of bonded fatty acids thereof comprise at least one fatty acid selected from the group consisting of caprylate, caprate, laurate, and myristate, and
    wherein said polyglycerin fatty acid ester has not leas than 70 percents by weight of mono-ester content, and not less than 90 percents by weight of bonded fatty acids thereof comprise at least one fatty acid selected from the group consisting of laurate and myristate, and polyglycerin of said polyglycerin fatty acid ester comprises one of hexaglycerin and decaglycerin.

4. The method as claimed in claim 1, wherein a substance obtained by hydrolyzing a protein is used as an additional foaming agent in combination with said foaming agent.

5. The method as claimed in claim 1, wherein at least one of saponin and sodium alginate is used as a foamable agent in combination with said foaming agent.

6. The method as claimed in claim 1, wherein at least one of stabilizers with low molecule weights is used for supporting foamability.

7. A cold confectionery including a cold mixture foamed with an overrun in the range of 150% to 500%, wherein said cold mixture includes, as foaming agents, saccharose fatty acid ester in the range of 0.005 percents by weight to 0.2 percents by weight in combination with polyglycerin fatty acid ester in the range of 0.005 percents by weight to 0.2 percents by weight.

8. The cold confectionery as claimed in claim 7, wherein said saccharose fatty acid ester has not less than 70 percents by weight of mono-ester content, and not less than 90 percents by weight of bonded fatty acids thereof comprise at least one fatty acid selected from the group consisting of caprylate, caprate, laurate, and myristate, and
    wherein said polyglycerin fatty acid ester has riot less than 70 percents by weight of mono-ester content, and not less than 90 percents by weight of bonded fatty acids thereof comprise at least one fatty acid selected from the group consisting of laurate and myristate, and polyglycerin of said polyglycerin fatty acid ester comprises one of hexaglycerin and decaglycerin.

9. The cold confectionery as claimed in claim 7, wherein said cold mixture further includes a substance obtained by hydrolyzing a protein as an additional foaming agent in combination with said foaming agent.

10. The cold confectionery as claimed in claim 7, wherein said cold mixture further includes at least one of saponin and sodium alginate as a foamable agent in combination with said foaming agent.

11. The cold confectionery as claimed in claim 7, wherein said cold mixture further includes at last one of stabilizers with low molecule weights for supporting foamability.

* * * * *